US008012549B1

(12) United States Patent
Doute

(10) Patent No.: US 8,012,549 B1
(45) Date of Patent: Sep. 6, 2011

(54) SIMULATED BALLOON SYSTEM

(76) Inventor: Jerry A. Doute, Canton, MI (US)

( * ) Notice: Subject to any disclaimer, the term of this patent is extended or adjusted under 35 U.S.C. 154(b) by 319 days.

(21) Appl. No.: 12/434,229

(22) Filed: May 1, 2009

(51) Int. Cl.
*B60R 13/00* (2006.01)

(52) U.S. Cl. ............ 428/31; 428/34.1; 428/99; 428/900

(58) Field of Classification Search .................... 428/33, 428/34.1, 31, 99, 900; 40/591, 592; 280/727
See application file for complete search history.

(56) References Cited

U.S. PATENT DOCUMENTS 7,669,355 B2 * 3/2010 Gronenthal et al. ....... 40/606.19

* cited by examiner

*Primary Examiner* — Alexander Thomas

(57) ABSTRACT

A simulated balloon system for that does not utilize a pressurized gas. The simulated balloon system generally includes a simulated balloon unit having a first portion and a second portion defining a lower opening when attached, a plurality of fasteners connected to the simulated balloon unit for removably attaching the first portion and the second portion, a support member extending from the lower opening of the simulated balloon unit, and a base attached to a lower end of the support member. The base may be comprised of a magnet for attaching to a metal object such as a vehicle.

20 Claims, 9 Drawing Sheets

SIMULATED BALLOON SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to balloons and more specifically it relates to a simulated balloon system that does not utilize a pressurized gas.

2. Description of the Related Art

Any discussion of the related art throughout the specification should in no way be considered as an admission that such related art is widely known or forms part of common general knowledge in the field.

Gas filled balloons are commonly utilized for various types of events (e.g. birthdays, anniversaries) and sales promotions (e.g. car sales, open-house). For example, car dealerships often times attached balloons to vehicles on their lot to attract attention to the vehicles. The balloons are typically filled with helium to provide an elevated position for the balloon with respect to the vehicle.

One of the problems with conventional balloons is that the helium or other gas typically escapes after a period of time thereby diminishing the appearance of the balloon. Another problem is that it can be labor intensive to be constantly filling balloons and attaching the same to a vehicle. Another problem is that continuous purchasing of helium and rubber balloons can be expensive for a business over time. Another problem is that the business may unexpectedly run out of helium resulting in delays to fill the balloons. A further problem is that conventional rubber balloons are discarded as refuse or may blow away resulting in contamination of the environment.

Because of the inherent problems with the related art, there is a need for a new and improved simulated balloon system that does not utilize a pressurized gas.

BRIEF SUMMARY OF THE INVENTION

The general purpose of the present invention is to provide a simulated balloon system that has many of the advantages of the balloons mentioned heretofore. The invention generally relates to a simulated balloon which includes a simulated balloon unit having a first portion and a second portion defining a lower opening when attached, a plurality of fasteners connected to the simulated balloon unit for removably attaching the first portion and the second portion, a support member extending from the lower opening of the simulated balloon unit, and a base attached to a lower end of the support member. The base may be comprised of a magnet for attaching to a metal object such as a vehicle.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a simulated balloon system that does not utilize a pressurized gas (e.g. air, helium).

Another object is to provide a simulated balloon system that reduces the costs and labor involved with businesses that utilize balloons for promotional purposes (e.g. car dealerships, real estate businesses).

An additional object is to provide a simulated balloon system that reduces the harmful effect of conventional rubber balloons on the environment.

A further object is to provide a simulated balloon system that has an extended useful life.

Another object is to provide a simulated balloon system that does not diminish in appearance throughout the day.

Another object is to provide a simulated balloon system that may be stored in a compact storage position.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
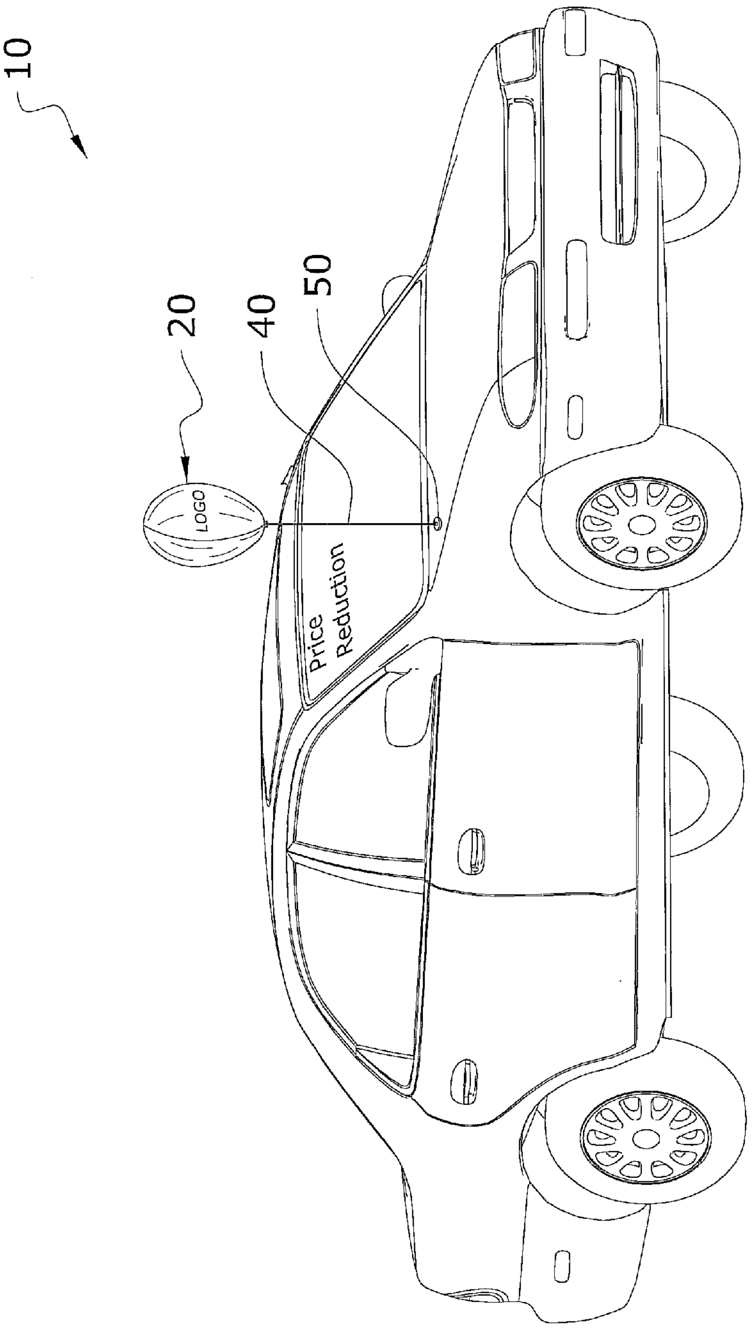
FIG. 1 is an upper perspective view of the present invention attached to a vehicle.

Turning now descriptively to the drawings, in which similar reference characters denote similar elements throughout the several views, FIGS. 1 through 7*c* illustrate a simulated balloon system 10, a simulated balloon unit 20 which comprises a first portion 22 and a second portion 24 defining a lower opening when attached, a plurality of fasteners 30 connected to the simulated balloon unit 20 for removably attaching the first portion 22 and the second portion 24, a support member 40 extending from the lower opening of the simulated balloon unit 20, and a base 50 attached to a lower end of the support member 40. The base 50 may be comprised of a magnet for attaching to a metal object such as a vehicle. When assembled, balloon system 10 provides a permanent and easily movable simulated balloon that requires minimal maintenance and does not rely on a supply of air or helium.

B. Simulated Balloon Unit

Figure 2:
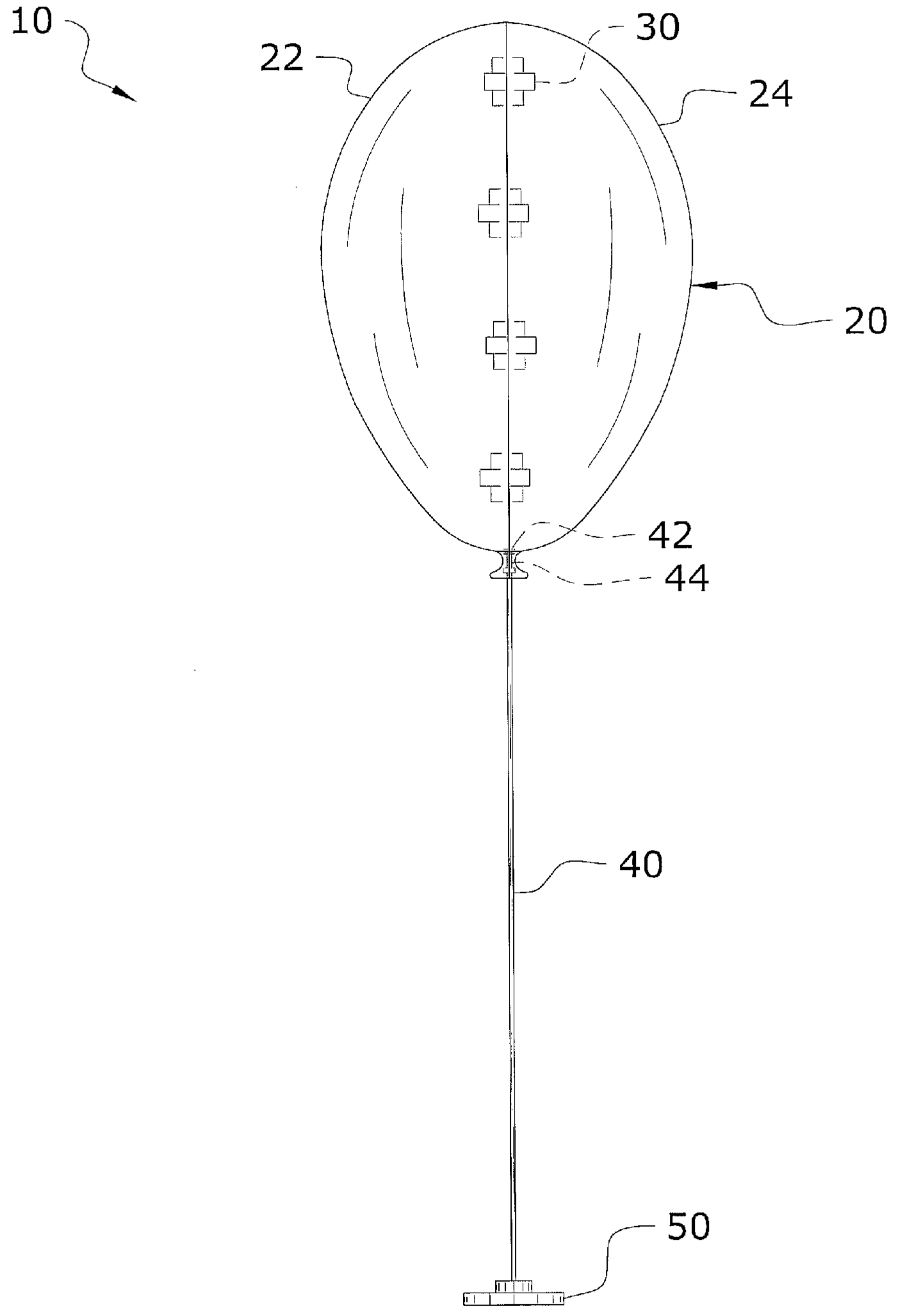
FIG. 2 is a side view of the present invention.
Figure 5:
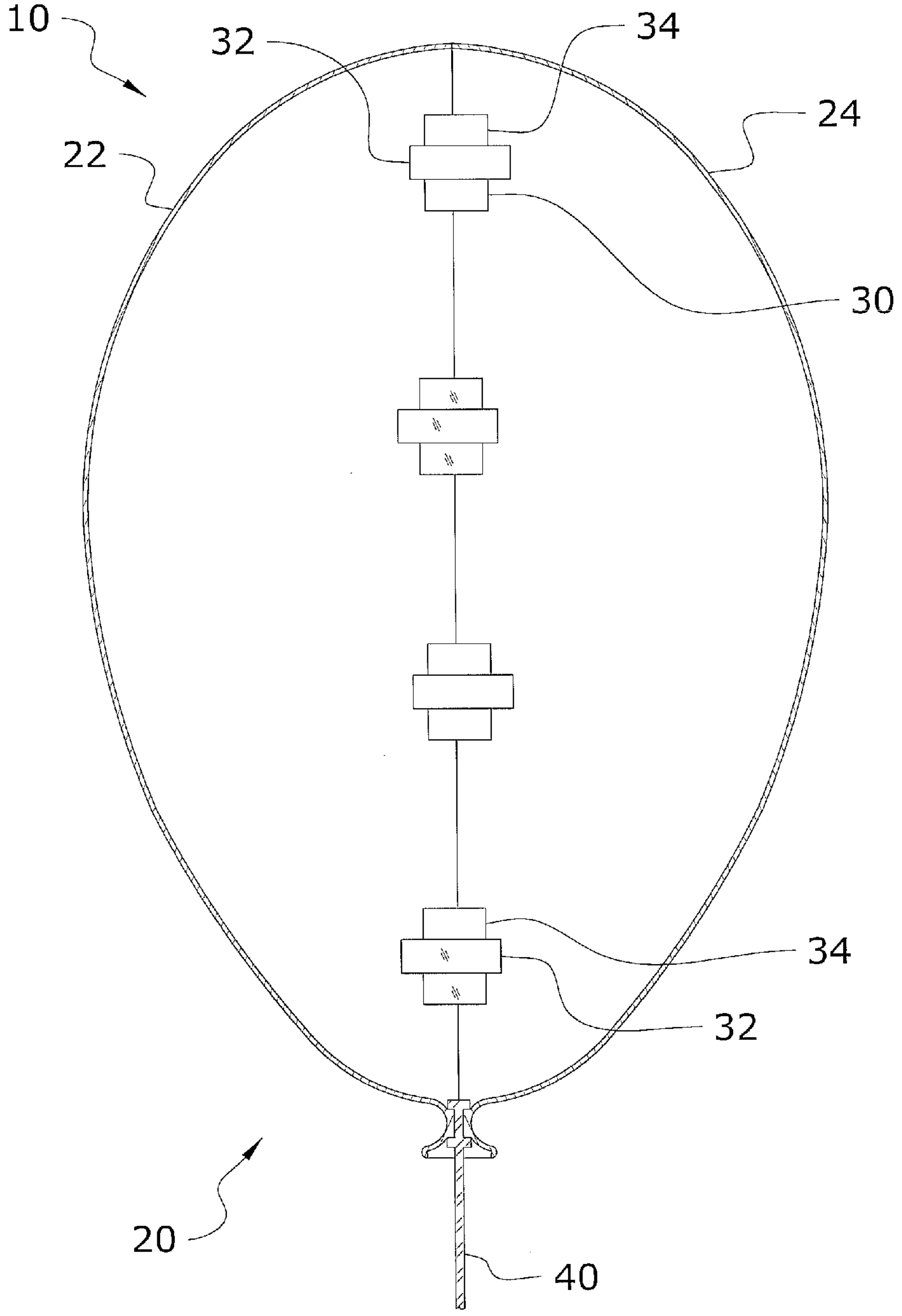
FIG. 5 is a side cross sectional view of the present invention.
Figure 6:
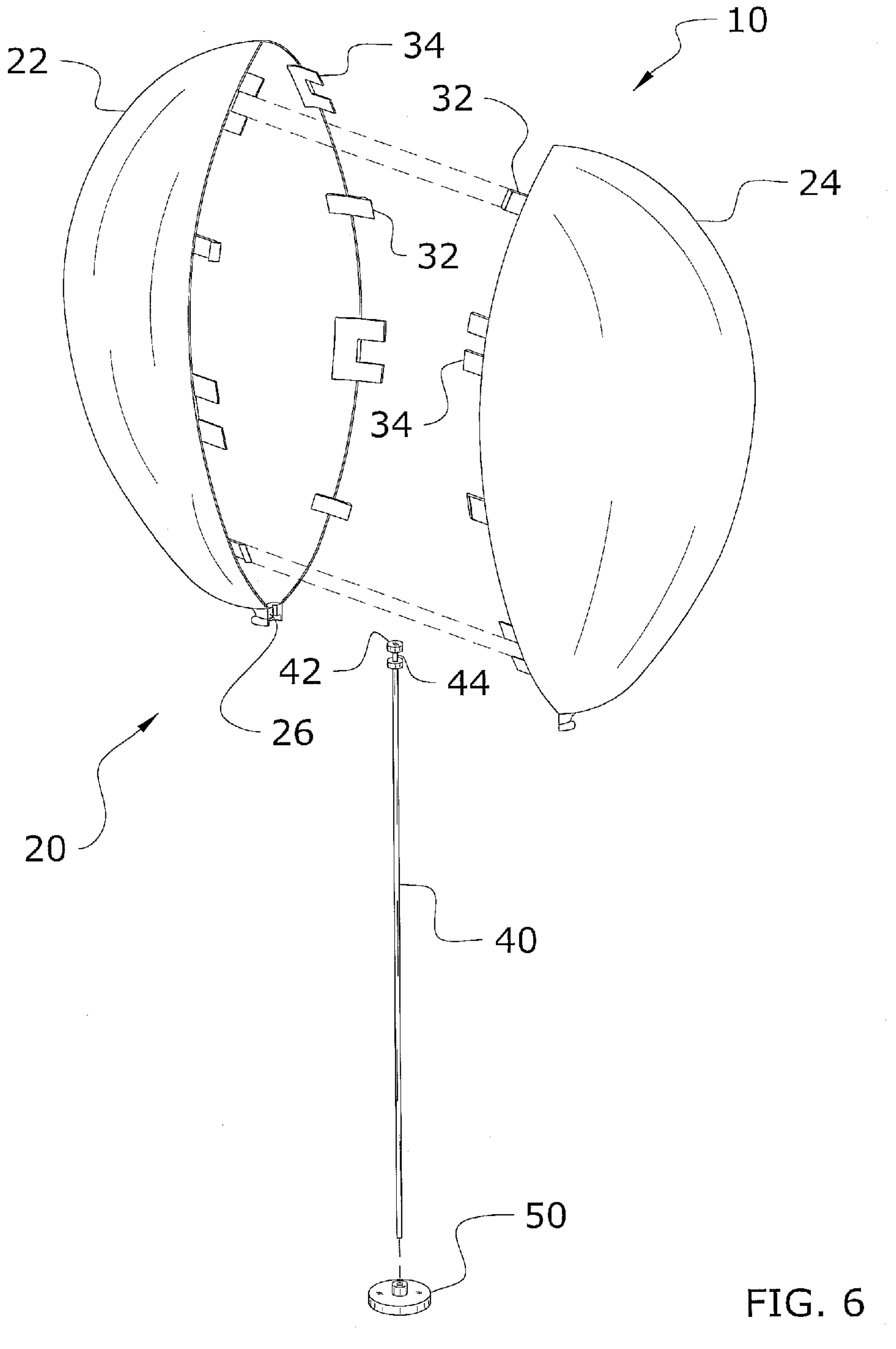
FIG. 6 is an exploded upper perspective view of the present invention.

Simulated balloon unit 20 is generally comprised of a conventional balloon shape such as illustrated in FIGS. 1, 2 and 5 of the drawings. The simulated balloon unit 20 may be comprised of various types of materials (e.g. plastic, metal), however plastic is the preferred material which can be colored to provide the appearance of a conventional rubber balloon. The simulated balloon may be comprised of various sizes of balloon shapes such as but not limited to 6 inches to 24 inches.

Figure 3:
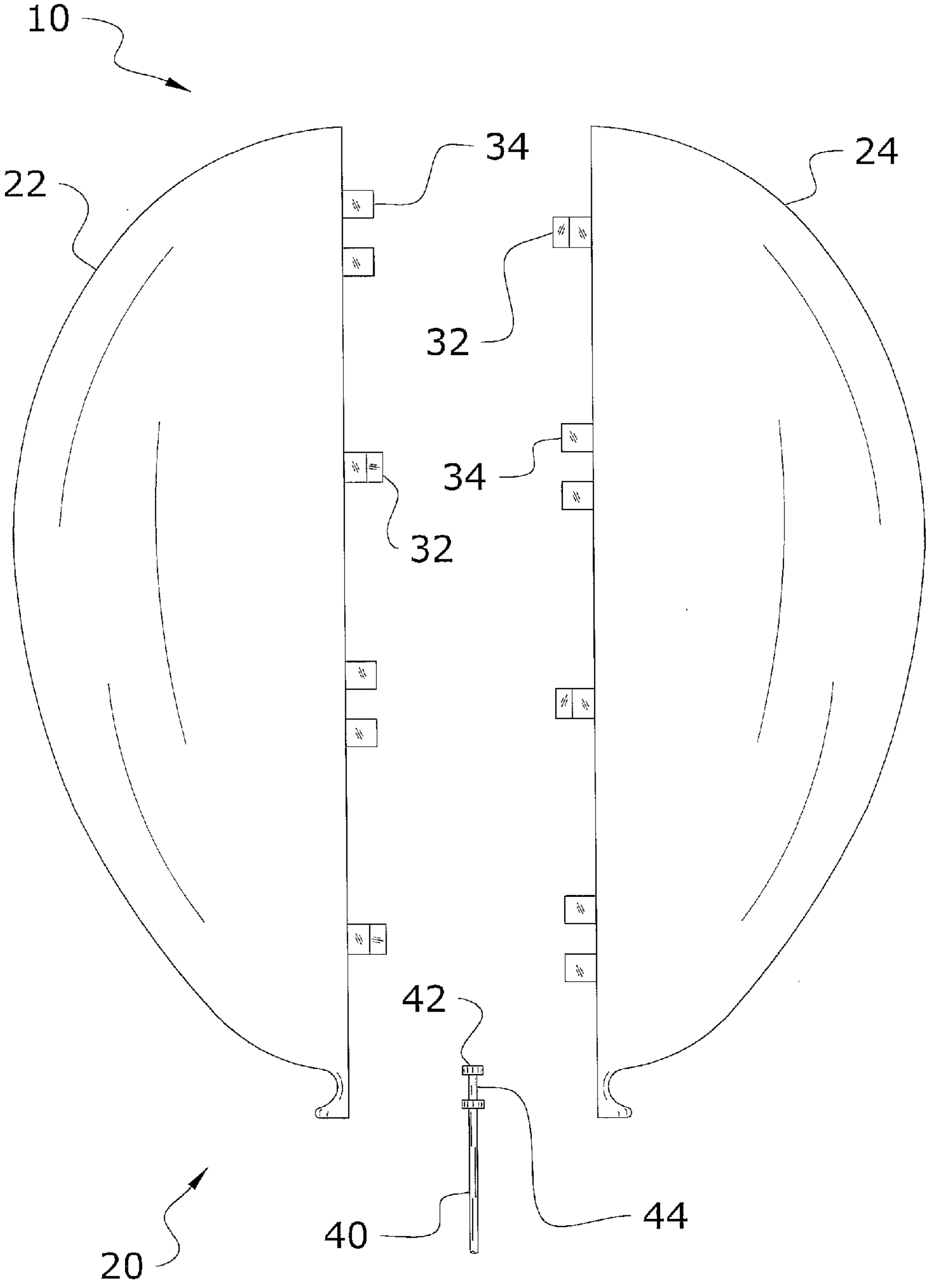
FIG. 3 is an exploded side view of the present invention.
Figure 4:
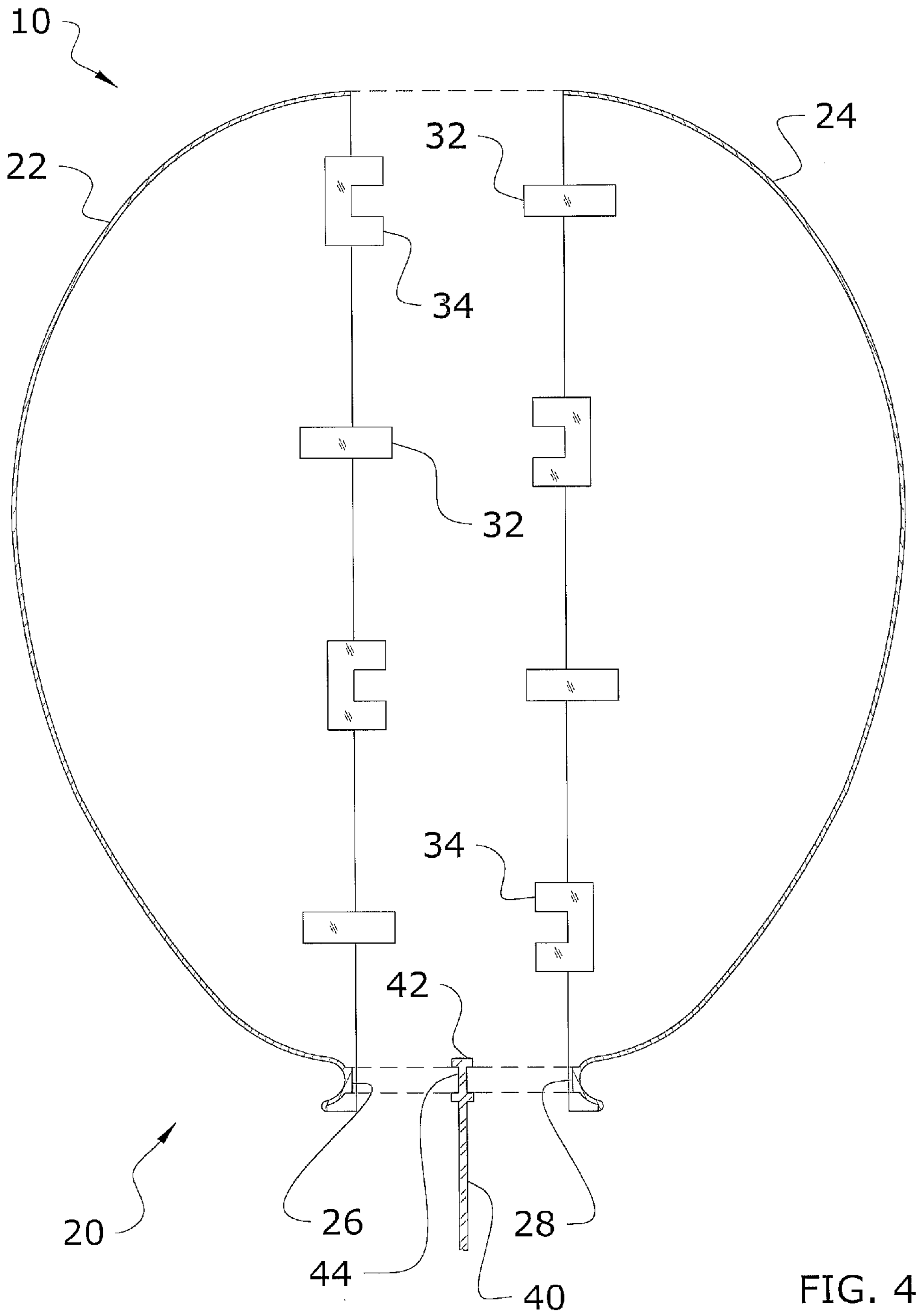
FIG. 4 is an exploded side cross sectional view of the present invention.

The simulated balloon unit 20 and includes a first portion 22 and a second portion 24 as best illustrated in FIGS. 3 and 4 of the drawings. The simulated balloon unit 20 may be comprised of a hollow or solid structure, however it is preferable to utilize a hollow structure for weight and storage reasons. The simulated balloon unit 20 may be comprised of various colors and patterns. It is appreciated that simulated balloon unit 20 may also include written text (e.g. company logo, event identifier such as "Happy Birthday") so as to allow users to commemorate events or place advertisements.

As best illustrated in FIGS. 3 and 4 of the drawings, the first portion 22 and second portion 24 are preferably each comprised of mirror opposite halves of simulated balloon unit 20. The first portion 22 and second portion 24 are each generally comprised of a semispherical shaped plastic mold. The first portion 22 and second portion 24 may comprised of various colors and may include text or other designs on their outer surfaces. First portion 22 and second portion 24 will preferably be capable of withstanding exposure to inclement weather, including high temperatures, sun, rain, snow and heat.

When the first portion 22 and second portion 24 are connected together, they preferably form a hollow structure as illustrated in FIG. 5 of the drawings. Furthermore, when the first portion 22 and second portion 24 are connected together they preferably form a lower opening that receives the support member 40 as best illustrated in FIGS. 3 through 5 of the drawings. The first portion 22 preferably includes a first lip 26 and the second portion 24 preferably includes an opposing second lip 28 that are received within a channel 44 that surrounds the upper end of the support member 40 as shown in FIG. 4 of the drawings. The lips 26, 28 are secured within the channel 44 thereby securing the simulated balloon unit 20 to the upper end of the support member 40 when the fasteners have secured the portions 22, 24 together.

C. Fasteners

The first portion 22 and second portion 24 are preferably removably connected via one or more fasteners 30 attached between the portions 22, 24 as illustrated in FIGS. 3 through 7*c* of the drawings. The fasteners 30 are preferably comprised of an engaging member 32 and a receiving member 34. A receiving member 34 on one portion of simulated balloon unit 20 will connect with an engaging member 32 on the other portion of simulated balloon unit 20.

Figures 7A, 7B, 7C:
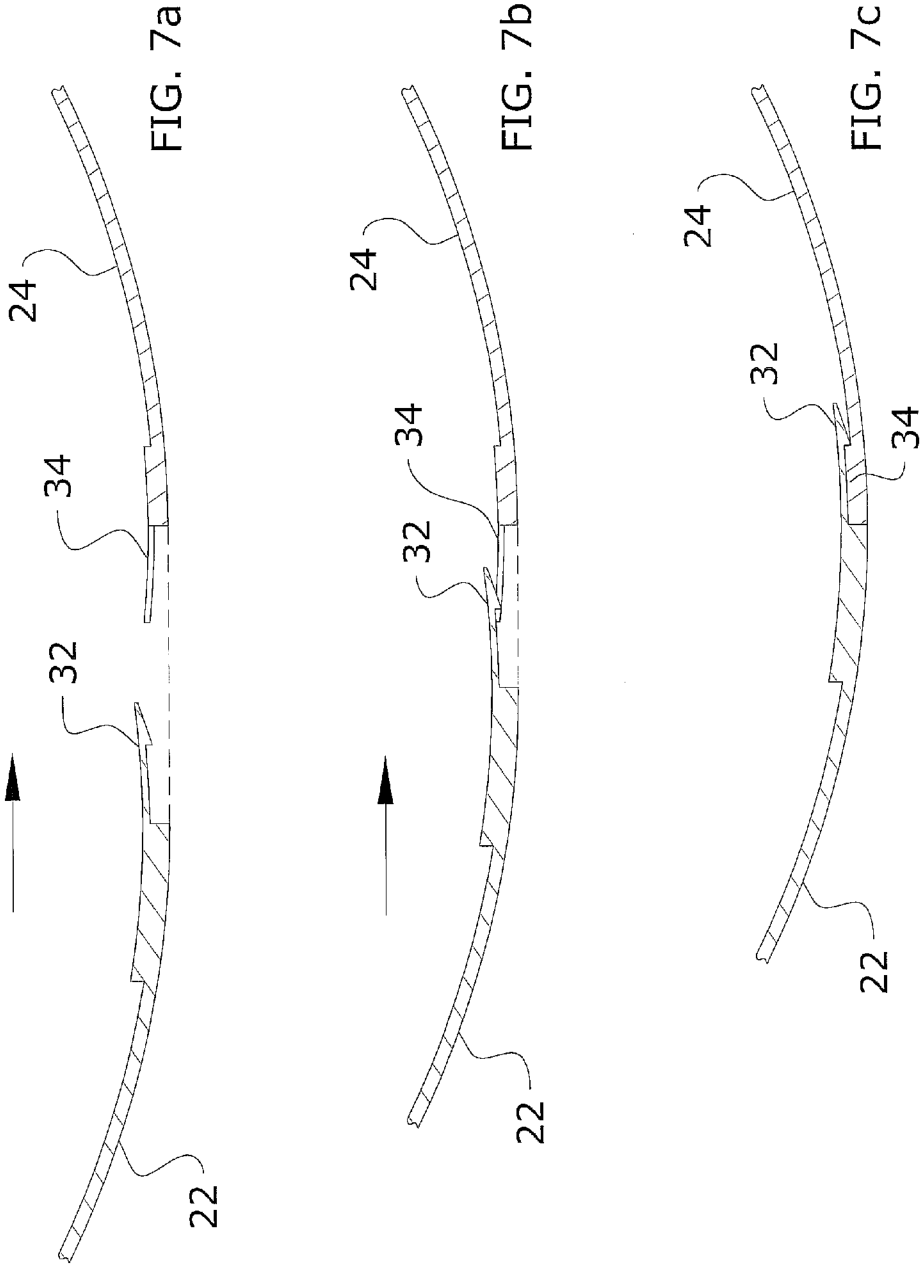
FIG. 7*a* is an exploded cross sectional view illustrating the fastener.
FIG. 7*b* is an exploded cross sectional view illustrating the fastener partially connected.
FIG. 7*c* is an exploded cross sectional view illustrating the fastener fully connected.

It is appreciated that multiple fasteners 30 may be utilized to provide further support for the connection of first portion 22 and second portion 24 of simulated balloon unit 20. Fasteners 30 may be comprised of various configurations such as but not limited latches, threaded fasteners, snaps and the like. FIGS. 7*a* through 7*c* illustrate a latch type structure with the engaging member 32 comprised of a hooked end structure that catchably engages a ridge on the second portion 24 between a pair of receiving members 34 that are used as guide structures.

The fastener 30 preferably creates a snug and seamless connection between first portion 22 and second portion 24. It is preferable that fastener 30 not be visible when simulated balloon unit 20 is assembled. This configuration creates a more uniform outer surface and more accurately replicates the appearance of a balloon. Furthermore, it is preferable that the fasteners 30 allow for later separation of the simulated balloon unit 20 for storage.

Figure 8:
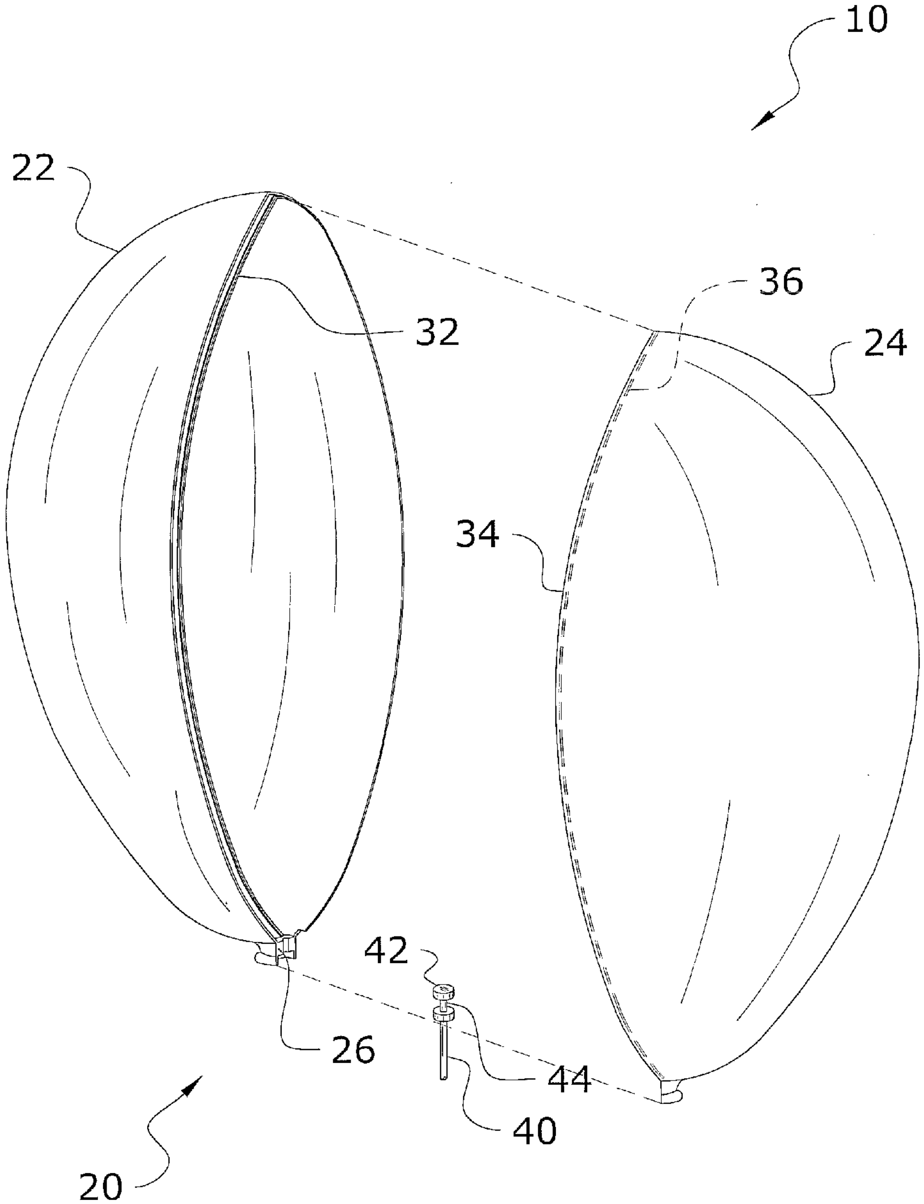
FIG. 8 is a cross section view of an alternative embodiment illustrating a receiver groove that receives the engaging member.
Figure 9:
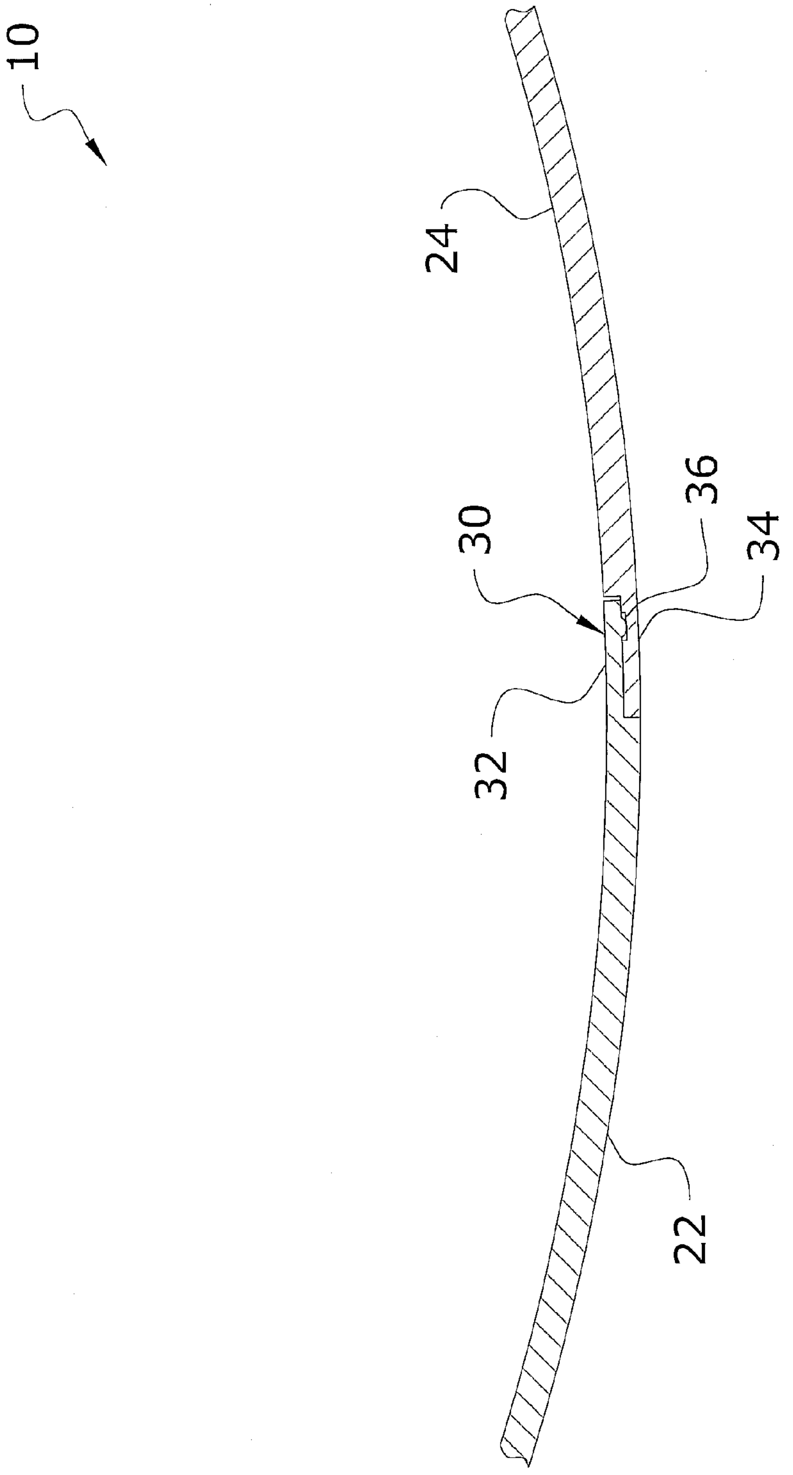
FIG. 9 is an exploded upper perspective view of the alternative embodiment in FIG. 8 illustrating the engaging member extending along the perimeter of the first portion of the simulated balloon unit.

FIGS. 8 and 9 illustrate an alternative fastener 30 comprised of an elongated receiver groove 36 extending within an interior surface of the second portion 24 and the engaging member 32 comprised of an elongated ridge structure extending outwardly from an exterior surface of the first portion 22. In the alternative embodiment shown in FIGS. 8 and 9 of the drawings, the engaging member 32 is received within the correspondingly shaped receiver groove 36 to retain the opposing portions 22, 24 of the simulated balloon unit 20 together. The engaging member 32 in the alternative embodiment preferably extends along the entire perimeter of the first portion 22 and the receiver groove 36 preferably extends along the entire perimeter of the second portion 24.

D. Support Member

The support member 40 provides a support for one or more simulated balloon units 30. The support member 40 also provides a connection between simulated balloon unit 30 and base 50 as shown in FIG. 2. The support member 40 is generally comprised of a rigid and elongated member comprised of a durable material capable of being subjected to the elements. It is also appreciated that support member 40 may be comprised of a flexible material so as to allow simulated balloon unit 20 to sway in the wind.

The support member 40 is preferably comprised of a thin steel support member, though it is appreciated that support member 40 may be comprised of various other materials, including composite materials. The support member 40 will generally emulate the appearance of a balloon string. The support member 40 may be comprised of various lengths, though it is preferable that support member 40 be of short enough length to allow for easy storage (e.g. 2-4 feet).

At its upper proximate end, support member 40 will generally include a connecting end 42 as shown in FIG. 4. Support member 42 will generally be comprised of the upper portion of support member 40, though it is appreciated that connecting end 42 may be comprised of a separate piece from support member 40. Support member 42 is generally comprised of a durable material, and may be comprised of the same material as support member 40.

Support member 42 will provide a connection between support member 40 and first portion 22 and second portion 24 of simulated balloon unit 20. Support member 42 is generally sandwiched between the lower ends of first portion 22 and second portion 24 when simulated balloon unit 20 is assembled. The upper end of the support member preferably includes at least one channel 44 that surrounds the upper end that snugly receives the lips 26, 28 on opposing sides thereof. Support member 42 may be comprised of various shapes and sizes, so long as it creates a secure connection between simulated balloon unit 20 and support member 40.

E. Base

The base 50 provides a support base for simulated balloon unit 20 and support member 40. The base 50 will generally be of sufficient width and weight to provide sufficient support for simulated balloon unit 20 and support member 40 to withstand exposure to winds or other inclement conditions. The base 50 is preferably weighted to ensure that the present invention remains in an upright position with various types of materials (e.g. sand, water, metal).

The base 50 will generally be comprised of a durable metal material, though it is appreciated that other materials and composite materials may be utilized so long as simulated balloon unit 20 and support member 40 are sufficiently supported. Base 50 preferably includes a magnet to allow for easy connection to the hood of a car or other metal materials without having to utilize a broad weighted structure for the base 50.

The base 50 includes an aperture or other opening for receiving support member 40 as shown in FIG. 2. The aperture may be threaded to receive a corresponding threaded lower end of the support member 40. It is also appreciated that various other securing methods may be utilized in connecting support member 40 to base 50.

F. Operation of Preferred Embodiment

In use, first portion 22, second portion 24, support member 40 and base 50 are separated. The portions 22, 24 may be stored in a compact storage position by positioning each portion 22, 24 within the interior portion of another forming a stacked structure. The support member 40 is inserted in between first portion 22 and second portion 24 of simulated balloon unit 20. The first portion 22 and second portion 24 are then connected together with the support member 40 in place (i.e. with the channel 44 receiving the lips 26, 28) via fasteners 30 by inserting each engaging member 32 into its corresponding receiving member 34. Support member 42 serves to hold support member 40 in place within the bottom of simulated balloon unit 20 by being sandwiched between the lower portions of first portion 22 and second portion 24.

The lower portion of support member 40 is then placed within base 50. Balloon system 10 is then ready for use and may be placed in various locations to commemorate events or place advertisements. For example, base 50 may then be placed on a car hood as shown in FIG. 1.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A simulated balloon system, comprising:

a base;

a support member having a lower end and an upper end, wherein said lower end is attached to said base;

a simulated balloon unit having a first portion, a second portion and at least one fastener attached between said first portion and said second portion securing said first portion to said second portion forming a substantially balloon shaped structure; and wherein said upper end of said support member is attached to a lower portion of said simulated balloon unit and wherein said support member supports said simulated balloon unit in an upright position simulating a floating balloon.

2. The simulated balloon system of claim 1, wherein said simulated balloon unit includes a lower opening within said lower portion, wherein said lower opening receives said upper end of said support member.

3. The simulated balloon system of claim 2, including a first lip extending inwardly into said lower opening from said first portion and a second lip extending inwardly into said lower opening from said second portion, wherein said first lip and said second lip are received within a channel in said upper end of said support member.

4. The simulated balloon system of claim 1, wherein said simulated balloon is comprised of a hollow structure.

5. The simulated balloon system of claim 1, wherein said first portion and said second portion substantially mirror one another.

6. The simulated balloon system of claim 1, wherein said at least one fastener is attached to an interior surface of said simulated balloon unit.

7. The simulated balloon system of claim 1, wherein said simulated balloon unit is comprised of a colored plastic material.

8. The simulated balloon system of claim 1, wherein said base is magnetic.

9. The simulated balloon system of claim 1, wherein said base includes a weight.

10. The simulated balloon system of claim 1, wherein said support member is comprised of a flexible material.

11. A simulated balloon system, comprising:

a vehicle;

a base attached to said vehicle;

a support member having a lower end and an upper end, wherein said lower end is attached to said base;

wherein said support member is comprised of a flexible material; and a simulated balloon unit having a first portion, a second portion and at least one fastener attached between said first portion and said second portion securing said first portion to said second portion forming a substantially balloon shaped structure;

wherein said upper end of said support member is attached to a lower portion of said simulated balloon unit and wherein said support member supports said simulated balloon unit in an upright position simulating a floating balloon.

12. The simulated balloon system of claim 11, wherein said simulated balloon unit includes a lower opening within said lower portion, wherein said lower opening receives said upper end of said support member.

13. The simulated balloon system of claim 12, including a first lip extending inwardly into said lower opening from said first portion and a second lip extending inwardly into said lower opening from said second portion, wherein said first lip and said second lip are received within a channel in said upper end of said support member.

14. The simulated balloon system of claim 11, wherein said simulated balloon is comprised of a hollow structure.

15. The simulated balloon system of claim 11, wherein said first portion and said second portion substantially mirror one another.

16. The simulated balloon system of claim 11, wherein said at least one fastener is attached to an interior surface of said simulated balloon unit.

17. The simulated balloon system of claim 11, wherein said simulated balloon unit is comprised of a colored plastic material.

18. The simulated balloon system of claim 11, wherein said base is magnetic.

19. The simulated balloon system of claim 11, wherein said base includes a weight.

20. A simulated balloon system, comprising:

a vehicle;

a base comprised of a magnetic structure, wherein said base is magnetically attached to said vehicle;

a support member having a lower end and an upper end, wherein said lower end is attached to said base;

wherein said support member is comprised of a flexible material;

a simulated balloon unit having a first portion, a second portion and at least one fastener attached between said first portion and said second portion securing said first portion to said second portion forming a substantially balloon shaped structure; and a first lip extending inwardly into said lower opening from said first portion and a second lip extending inwardly into said lower opening from said second portion, wherein said first lip and said second lip are received within a channel in said upper end of said support member;

wherein said simulated balloon is comprised of a hollow structure;

wherein said first portion and said second portion substantially mirror one another;

wherein said simulated balloon unit is comprised of a colored plastic material;

wherein said at least one fastener is attached to an interior surface of said simulated balloon unit;

wherein said upper end of said support member is attached to a lower portion of said simulated balloon unit and wherein said support member supports said simulated balloon unit in an upright position simulating a floating balloon;

wherein said simulated balloon unit includes a lower opening within said lower portion, wherein said lower opening receives said upper end of said support member.

* * * * *